United States Patent [19]

Debortoli et al.

[11] Patent Number: 5,071,211
[45] Date of Patent: Dec. 10, 1991

[54] CONNECTOR HOLDERS AND DISTRIBUTION FRAME AND CONNECTOR HOLDER ASSEMBLIES FOR OPTICAL CABLE

[75] Inventors: George Debortoli, Ottawa; Laurence A. J. Beaulieu; Brian T. Osborne, both of Kanata, all of Canada

[73] Assignee: Northern Telecom Limited, Montreal, Canada

[21] Appl. No.: 423,281

[22] Filed: Oct. 18, 1989

Related U.S. Application Data

[63] Continuation-in-part of Ser. No. 286,904, Dec. 20, 1988, abandoned.

[51] Int. Cl.$^5$ ............................................. G02B 6/36
[52] U.S. Cl. ........................................ 385/76; 174/50; 174/52.4; 385/135
[58] Field of Search ............... 350/96.20, 96.21, 96.22; 174/50, 52.4, 54; 361/338, 340, 391

[56] References Cited

U.S. PATENT DOCUMENTS

| | | |
|---|---|---|
| 4,265,513 | 5/1981 | Matsushita et al. ............... 350/96.16 |
| 4,359,262 | 11/1982 | Dolan ................................ 350/96.20 |
| 4,432,602 | 2/1984 | Margolin ........................... 350/96.22 |
| 4,502,754 | 3/1985 | Kawa ................................ 350/96.20 |
| 4,585,303 | 4/1986 | Pinsard et al. ..................... 350/96.20 |
| 4,627,686 | 12/1986 | Szentesi ............................. 350/96.20 |
| 4,630,886 | 12/1986 | Lauriello et al. ................... 350/96.20 |
| 4,702,551 | 10/1987 | Coulombe .......................... 350/96.21 |
| 4,708,430 | 11/1987 | Donaldson et al. ................ 350/96.20 |
| 4,717,231 | 1/1988 | Dewez et al. ...................... 350/96.20 |
| 4,792,203 | 12/1988 | Nelson et al. ....................... 350/96.2 |
| 4,856,866 | 8/1989 | Freeman et al. ................... 350/96.21 |
| 4,861,134 | 8/1989 | Alameel et al. ..................... 350/96.2 |
| 4,886,336 | 12/1989 | Deusser et al. .................... 350/96.21 |
| 4,898,448 | 2/1990 | Cooper ............................... 350/96.2 |
| 4,900,123 | 2/1990 | Barlow et al. ...................... 350/96.2 |
| 4,911,521 | 3/1990 | Ryuto et al. ........................ 350/96.2 |
| 5,024,498 | 6/1991 | Becker et al. ...................... 350/96.21 |

FOREIGN PATENT DOCUMENTS

| | | |
|---|---|---|
| 0215668 | 9/1986 | European Pat. Off. ......... 350/96.23 |
| 2735106 | 2/1979 | Fed. Rep. of Germany . |
| 3405309 | 2/1984 | Fed. Rep. of Germany . |
| 59-74523 | 4/1984 | Japan . |
| 8504960 | 4/1984 | PCT Int'l Appl. . |

Primary Examiner—John D. Lee
Assistant Examiner—Stephen W. Barns
Attorney, Agent, or Firm—R. J. Austin

[57] ABSTRACT

A planar connector holder for optical fibers having storage compartments for incoming fibers and a mounting region for connectors to outgoing fibers. Two storage compartments lie back-to-back on each side of a planar base of the holder, the compartments being interconnected for fiber to pass from compartment-to-compartment. The mounting region and the storage compartments are aligned from end-to-end of the holder. With connector mounts mounted in the mounting region, the mounts lie in planes common with the two storage compartments in a depth direction of the holder. Also included is a distribution frame and holder combination in which the holders are mounted in two banks with patch cords extending between the banks and selectively between connectors.

51 Claims, 10 Drawing Sheets

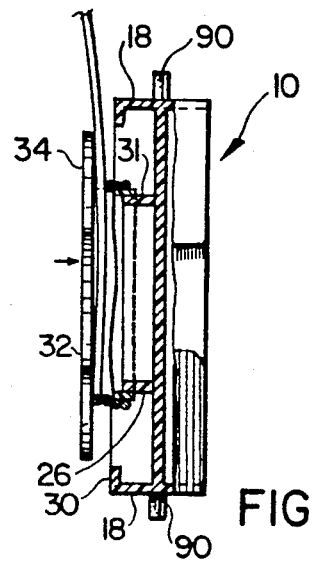
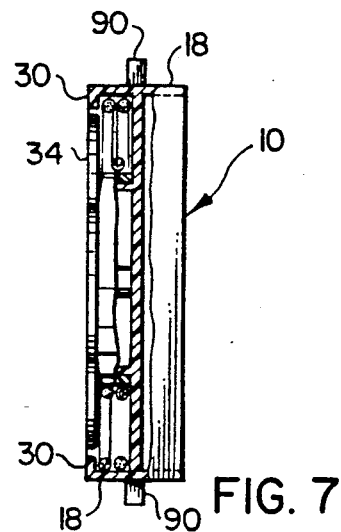
FIG. 6       FIG. 7
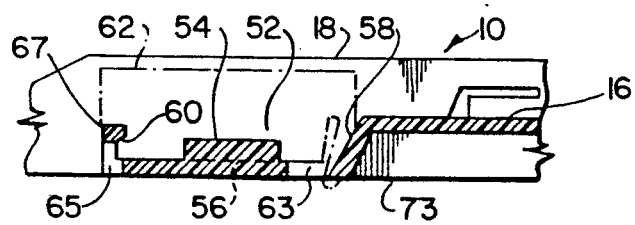
FIG. 8
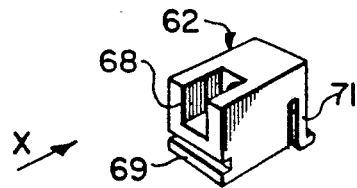
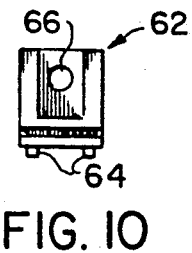
FIG. 9       FIG. 10

CONNECTOR HOLDERS AND DISTRIBUTION FRAME AND CONNECTOR HOLDER ASSEMBLIES FOR OPTICAL CABLE

This invention relates to connector holders and distribution frame and connector holder combinations for optical cable and is a Continuation-In-Part of U.S. application Ser. No. 286,904 filed Dec. 20, 1988, now abandoned.

BACKGROUND OF THE INVENTION

In the optical cable telecommunications industry, when optical fibers are connected in series, this may be done either with a mechanical connector or by fusing the ends of the fibers together in a packaged connection splice. In either case, adjacent ends of the in series fibers are held in axial alignment. End portions of optical fibers extending from the packaged splices may be coiled in organizing trays which also house the packaged splices An arrangement of this type is shown in U.S. Pat. No. 4,359,262, granted Nov. 16, 1982 and U.S. Pat. No. 4,489,830 granted Dec. 25, 1984.

In the electrical cable telecommunications industry, conductor wires of an electrical telecommunications cable entering a customer's premises are normally connected to conductor wires of the customer's internal network by the use of a distribution frame. Incoming cable extends to the distribution frame and the jacket and other material surrounding the core of the cable is removed for a distance along the cable from its end to expose the core. Groups of insulated conductor wires are directed from the core and are connected to terminals on the incoming side of different connectors held by the frame, one group to the terminals of each connector. Conductor wires of the internal network are then connected to other terminals on the outgoing side of the connectors so that each connector wire of the internal network is connected to an individual conductor wire of the incoming cable. A typical distribution frame is described in U.S. Pat. No. 4,278,315 granted July 14, 1981 in the name of B. T. Osborne. This arrangement of distribution frame allows for removal and reinsertion of conductors of the internal network or for interchange of terminals for these conductor wires without any need for the customer to interfere with the terminals of the incoming cable.

Thus, an incoming electrical telecommunications cable is connected to the conductor wires of a customer's internal network in an essentially straightforward manner and in a compact arrangement of distribution frame. In such a compact arrangement, as many as five hundred connections are possible to conductor wires of a customer's internal network with a frontal area of a rectangular distribution frame provided by side measurements of approximately 8 inches by 12 inches. However, in the optical cable field, which is more recently being developed, it has not been possible to provide such compact arrangements of distribution frames to connect an incoming cable directly with the optical fibers of an internal network. This is partly because no practical optical cable distribution frame has been designed which gives a high density of connections. It is also partly due to methods of making optical fiber connections which are wasteful of space.

In this latter regard, while optical fibers of the incoming cable could be spliced directly to the fibers of the internal network, this has been shown to be unsatisfactory, because splicing is a substantially permanent connection which hampers the customer's freedom to remove, or interchange connecting positions to the fibers of his internal network. Hence, it is advantageous to be able to use mateable mechanical connectors between the incoming optical cable and the internal network. Mateable mechanical connectors are quickly connectable and disconnectable. With these connectors mounted upon incoming optical fibers (i.e. of the incoming cable) and upon fibers of this internal network this allows for selectively removing and interchanging fibers of an internal network with incoming fibers. However, mechanical connectors require an inordinate amount of time to connect to their respective fibers and for this reason, the use of mechanical connectors to connect incoming optical fibers of an incoming cable directly to fibers of an internal network is commercially unacceptable to cable installation companies.

In order to avoid this problem, incoming optical fibers are conventionally joined to optical fibers of an internal network by use of structures referred to as "pigtails". A pigtail is located in series between a respective incoming optical fiber and an internal network fiber so as to connect them together. A pigtail is a factory made item which comprises a protection surrounded optical fiber of certain length (referred to herein as a "pigtail fiber") and a mechanical connector which is joined to one end of the pigtail fiber. Optical fibers of the incoming cable are connected to the free ends of pigtail fibers by splicing operations, such operations being less time consuming than with the use of mechanical connectors. The splicing operations thus optically couple the optical fibers of the incoming cable with the mechanical connectors of the pigtails. These connectors are mounted upon a framework to make them readily accessible for the customer to connect the optical fibers of his internal network thereto.

While the conventional arrangement described above for connecting incoming optical cables to a customer's internal network has been found to be largely acceptable, design arrangements are unsatisfactory in some respects. In one conventional arrangement, the incoming cable is spliced to the pigtail fibers at a different location from that in which the connectors are mounted upon the framework. No compact and simple connection arrangement is thus produced in one distribution frame. For this reason, the pigtail fibers essentially require surrounding protection. Protection is normally in the form of a surrounding loose tube which allows for lateral freedom of movement of each individual fiber. Suggestions have been made for having a common holder for the splices and the pigtails to allow for ease of access by a customer. However, while these suggestions could eliminate the need for surrounding protection to the pigtail fibers, only a few of these suggestions could provide for ease of access to the cable installation company into the holders in the event of problems occurring in the connections or in the incoming fibers.

In one of these structures, as described in German Offenlegungsschrift 2735106, a housing carries a tray which is pivotally mounted for movement in and out of the housing. Incoming optical fibers are stored within the tray and are connected to pigtail fibers also stored within the tray. The pigtail fibers extend from the tray to pigtail connectors mounted at the rear of the housing. It would be very inconvenient for a maintenance person to service the tray pivoted out from the front of the housing while, at the same time having to concern himself with connectors at the rear of the housing. It would also be extremely difficult to know which of the incoming optical fibers corresponded to a certain connector at the rear of the housing. Apart from this, the width of the housing would need to be such as to provide clearance for pivotal movement of the tray. In U.S. Pat. No. 4,792,203 a structure is described which is similar to that described in the above German document. In the structure described in the U.S. patent, however, the pigtail connectors are all mounted upon trays within a housing. There is a problem that only a small number of pigtail connectors are shown on each tray in the U.S. patent so that only a low density of fiber connections is possible in the housing. In one commercially available construction of this type, the density of connectors is such that only about 250 incoming fibers would be connectable to distribution fibers of an internal network in a housing having frontal area dimensions of approximately 84 inches by 26 inches. The design of each tray is such that an increase in the number of pigtail connections would result in an increase in width of the housing to accommodate the tray.

In addition, in both of the prior arrangements referred to above, the cable installer must install his fibers into each tray with the tray mounted upon the housing thereby cramping the activities of the installer.

SUMMARY OF THE INVENTION

The present invention provides a planar connector holder and which allows for a greater density of incoming optical fiber connections into an internal network than has previously been possible while also providing for ease of accessability to both fibers and connectors. In addition, the present invention provides an optical fiber distribution frame and connector holder combination to provide a high density of fiber connections while enabling the size of the distribution frame to be minimized.

According to one aspect of the present invention, there is provided a planar connector holder for connecting a plurality of incoming optical fibers of an incoming optical fiber cable to outgoing fibers, the holder having: remote front and rear end regions and sides extending from the first to the second remote end region; a storage facility for the storage of a plurality of coiled lengths of fiber with the fiber coils in planes of the holder, the storage facility lying between sides of the holder; means in the storage facility for limiting the minimum bend radius of the associated coils; and a mounting region for a plurality of terminal connectors, the mounting region disposed at the first end region of the holder with the storage facility directly disposed between the mounting region and the rear end of the holder the mounting region contained between the sides and comprising a plurality of connector mounting positions extending in an array in the plane of the holder and across the front end region.

With the structure of the holder according to the invention, the mounting region extends along the front end region and may accommodate the total width of the holder provided for the storage facility whereby extra width of the holder in addition to that required for the storage facility is unnecessary. Hence, in one example, with the storage facility occupying substantially the total width of the holder and having a minimum bend radius limiting means of approximately 3 inches to provide a holder width of approximately "5.4" inches, it is found that with a mounting region extending for this width, as many as twelve connectors may be provided in the mounting region dependent upon the connector size. As a result, each holder is capable of connecting twelve incoming fibers to twelve outgoing fibers through the connections solely in the width of holders required for storage.

Preferably, the storage facility has two means for limiting the minimum bend radius of optical fiber coils, the two means being separated so as to limit the bend radius of two sets of coils with each set at a different location in the facility.

The storage facility may comprise a single storage compartment. However, in one preferred arrangement, the storage facility has a first and second storage compartments for storing two sets of coils of fiber, one set in each compartment. In this arrangement, it is preferable that a base is provided in the holder, the compartments being spaced apart one on each side of the base and opposed to one another in a depth direction of the holder which is normal to the plane of the holder. With this arrangement, the length of the holder, i.e. from the front to the rear end region, is minimized as the two compartments are not required side-by-side along the length, but occupy the same part of the holder in the length direction. In a further preferred arrangement with the two compartments disposed in opposition to one another, and with the holder base generally planar, the mounting surface lies on one side of the general plane of the holder base and faces towards the general plane of the holder. In this latter preferred construction, the connector holder size is minimized in all directions and it is ensured that the connectors are mounted so as to lie in the depth direction in the same region as one or both of the compartments. It follows that a holder with minimized overall dimensions is capable of accommodating up to possibly twelve connectors.

According to a further aspect of the invention there is provided an optical fiber distribution frame and connector holder combination comprising a plurality of planar connector holders each for connecting a plurality of incoming optical fibers of an incoming optical fiber cable to outgoing optical fibers, each holder having: a front and rear end regions spaced from one another and sides extending from the front to the rear end region; a storage facility for the common storage of a plurality of coiled lengths of fiber with the fiber coils in planes of the holder the storage facility lying between the sides of the holder; means in the storage facility for limiting the minimum bend radius of the associated coils; and a mounting region for a plurality of optical terminal connectors, the mounting region disposed at the front end region of the holder with the storage facility directly disposed between the mounting region and the rear end region of the holder, the mounting region contained between the sides and comprising a plurality of connector mounting positions extending in an array along the front end region and in the plane of the holder; and a distribution frame having a front and a rear and providing a plurality of side-by-side holder receiving stations each of which extends towards the rear of the frame and has access at the front of the frame; and the frame and holders being cooperable to allow for insertion of each holder into a corresponding one of the receiving stations by a movement of each holder toward the rear of the frame with the front end region of each holder at the front of the frame.

Further, according to the invention there is provided an optical fiber distribution frame and connector holder combination comprising: a distribution frame having a front and a rear and providing a plurality of side-by-side holder receiving stations each of which extends towards the rear of the frame and opens at the front of the frame; a plurality of groups of incoming optical fibers of an incoming optical cable, each incoming group extending one to each of the receiving stations; a set of planar connector holders, each holder having remote front and rear end regions spaced in a first direction lying in a plane of the holder, sides extending from the front to the rear end region, and a mounting region for a plurality of optical terminal connectors, the mounting region disposed at the front end region of the holder, contained between the sides, and comprising a plurality of connector mounting positions extending in an array along the front end region and in the plane of the holder, some at least of the mounting positions carrying an optical connector with the optical connectors spaced apart along the mounting region; the group of outgoing fibers extending from each of the optical connectors; the frame and holders being cooperable to allow for insertion of each holder into a corresponding one of the receiving stations by a movement of each holder towards the rear of the frame with the front end region of each holder at the front of the frame; each holder further having: a storage facility storing a corresponding group of incoming optical fibers in coiled form with the coils in planes parallel to the plane of the holder and fibers of the group optically coupled to corresponding optical connectors; and means in the storage facility for limiting the minimum bend radius of the coils contained therein.

An excess length of each group of incoming optical fibers may be provided outside each respective holder to enable the holder to move into and out of its receiving station accompanied by flexure of the excess length. Alternatively, the storage facility allows for change in coil size and with the group of incoming optical fibers extending into the facility through an inlet, movement of the holder into and out of its receiving station is accompanied by progressive movement of the group of fibers into or out of the holder through the inlet to provide a corresponding change in coil size.

In a distribution frame and connector holder combination according to the invention, each group of incoming optical fibers may be contained within an individual tube forming a part of and extending from the incoming optical cable. Alternatively, no tube is provided and each group of incoming optical fibers is exposed as it extends to its holder receiving station. In cases where tubes are provided, the fibers are normally of small diameter, e.g. around 0.25 mm and in need of greater protection than fibers devoid of tubes, these latter fibers normally being of larger diameter, e.g. around 0.9 mm. In a holder structure comprising a first and second storage compartments which are interconnected and where tubes each encloses a group of fibers, each tube extends in coiled form around the first compartment and passes through a strain relief, by which it is held, before the tube or the incoming optical fibers extending from an end of the tube pass to the second compartment. Alternatively, where no tube is provided, the group of fibers extend around the first compartment and is held directly by strain relief before passing to the second compartment.

With the combinations of distribution frame and connector holders according to the invention, and because the holders are capable of accommodating connectors completely along the mounting region of the holders, which region occupies the full dimensional requirements for the storage facility, then there is a substantial density of connections to outgoing fibers to a customer's internal network. As a specific example of this, with a distribution frame size of 84 inches by 26 inches, 1440 optical connections are possible in two banks of holders with 60 holders in each bank.

According to yet a further aspect of the invention, there is provided a method of optically coupling a group of incoming optical terminal fibers to optical connectors and locating the fibers and connectors in a distribution frame having a front and a rear comprising: directing the group of fibers to cause it to extend from the frame to a planar connector holder for optical connectors, the holder disposed in a position spaced from the distribution frame and having front and rear end regions remote from each other; at a position spaced from ends of the fibers in the group, disposing the group of fibers in a fixed location on the holder by passing the group through a strain relief to provide end portions of the fibers extending from one side of the strain relief and lengths of the group of fibers extending from the other side of the strain relief to the distribution frame; optically coupling ends of the fibers of the group to the optical connectors; mounting the connectors in an array disposed along the front end region of the holder and in the plane of the holder; forming fiber extending from the connectors into coils in a storage facility of the holder, the storage facility disposed directly between the array of connectors and the rear end region of the holder; moving the holder towards the distribution frame while forming the lengths of the group extending from the strain relief to the distribution frame into coils in the storage facility; and moving the holder into a receiving station in the distribution frame with the front end region of the holder at the front of the frame.

BRIEF DESCRIPTION OF THE DRAWINGS

Embodiments of the invention will now be described, by way of example, with reference to the accompanying drawings, in which:

FIGS. 6 and 7 are cross-sectional views of the holder taken along line VI—VI in FIG. 2 and showing two different positions of a movable part of the holder;

FIG. 8 is a cross-sectional view of the holder taken along line VIII—VIII in FIG. 4;

FIG. 9 is an isometric view of a connector mount for use in the holder of previous figures;

FIG. 10 is an end view of the holder taken in the direction of arrow X in FIG. 9;

DETAILED DESCRIPTION OF THE EMBODIMENTS

Figure 1:
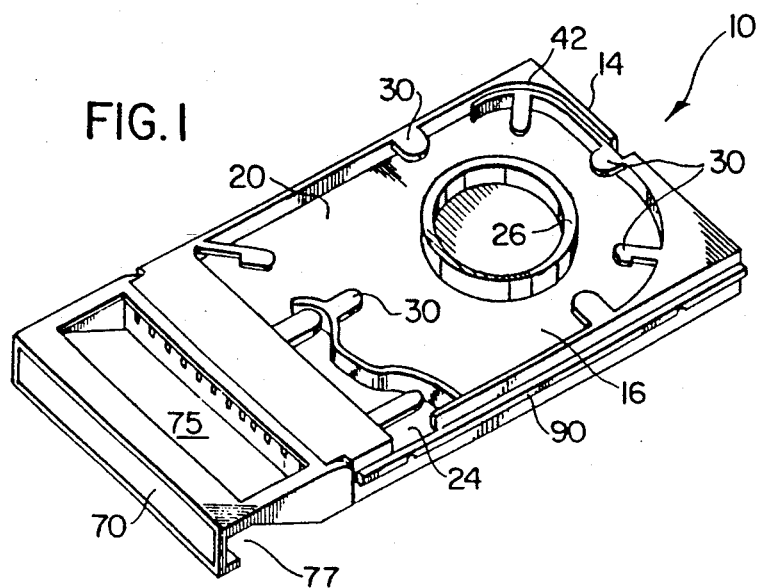
FIG. 1 is an isometric view of one side of a connector holder according to a first embodiment.
Figure 2:
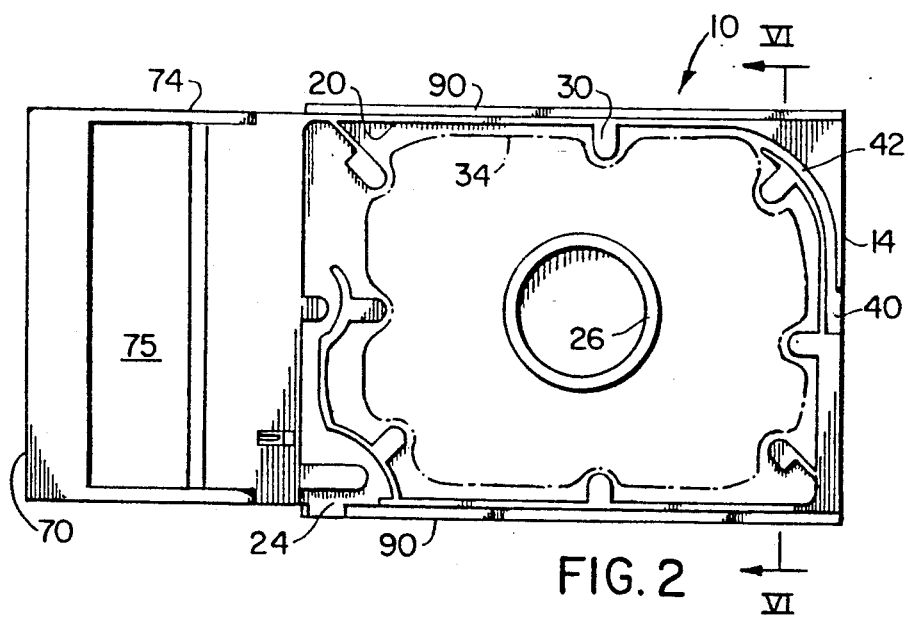
FIG. 2 is a plan view of the side of the holder shown in FIG. 1.

A planar connector holder 10 according to a first embodiment is shown in FIGS. 1 to 4. The holder has a mounting region 12 for a plurality (namely twelve) of optical connectors as will be described, the mounting region being disposed at a front end region of the holder. Between the mounting region 12 and a rear end region 14 of the holder extends a planar holder base 16 lying in a plane of the holder. The holder base extends lengthwise of the holder from the mounting region to the rear end region and also between sides of the holder provided by side walls 18. The holder base 16 is disposed substantially half-way in the depth direction of the holder (as shown in FIG. 8) with side walls 18 extending above and below the base.

The holder 10 has a storage facility for storing coiled lengths of optical fiber. This facility comprises two storage compartments, namely a first compartment 20 on one side of the holder base and a storage compartment 22 on the other side of the holder base. The two compartments lie between side walls 18 and between the mounting region 12 and the rear end region of the holder.

The first compartment is provided for storing a tube containing a group of incoming optical fibers as will be described, the tube extending from an incoming optical fiber cable. One side wall 18 is provided with an inlet opening 24 towards the mounting region 12 for introducing the tube into the first compartment 20. Means is provided in the first or tube storage compartment 20 for limiting the minimum bend radius of coils of the tube which is to be disposed within it. This bend radius limiting means comprises a cylindrical member 26 and surrounding cup 32, the member 26 extending from the holder base and being disposed a substantial distance from the side walls 18 and rear end 14 of the storage compartment to enable the coils of the tube to increase in diameter or decrease as required. Retaining projections 30 extend inwardly from the side walls 18 and rear end 14 over the tube storage compartment for the purpose of retaining coils of the tube within the compartment. The cup 32 has a cylindrical portion 31 which is frictionally held by the member 26 and is telescopically movable upon member 26 from an inner operative position as shown in FIG. 7 to a position outwardly from the member 26 and beyond side walls 18 as shown in FIG. 6. The cup 32 has a retaining flange 34 which extends radially outwardly and opposes the projections 30 so that, with the cup in the inner operative position of FIG. 7, projections 30 and flange 34 lie substantially close to each other to prevent removal of a tube from between them. The cup 32 is omitted from other figures for clarity except for a chain-dotted outline of flange 34 in FIG. 2. With the cup 32 moved to the position shown in FIG. 6, a gap is provided between the projections 30 and flange 34 to enable the tube to be coiled around the cylindrical member 26.

Figure 4:
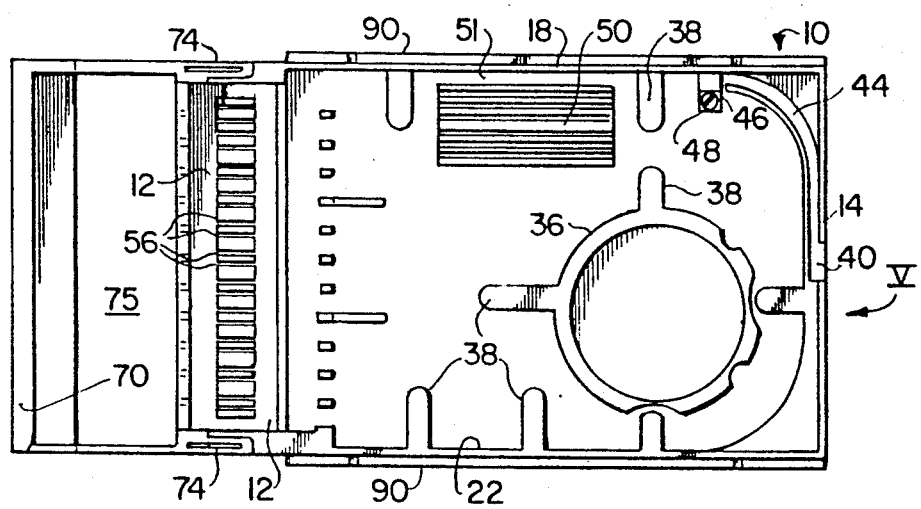
FIG. 4 is a plan view of the other side of the holder shown in FIG. 3.

On the other side of the holder base, the second storage compartment 22 is a fiber storage compartment. The fiber storage compartment 22 has a minimum bend radius limiting means in the form of a cylinder 36 extending from the base, and retaining projections 38 extend inwards from the side walls 18 and rear end 14 and radially out from the cylinder 36 to hold coils of fiber in position. The two compartments 20 and 22 are interconnected by a passage 40 formed by a discontinuity in the rear end 14 of the holder. A curved guide passage 42 is formed in the tube storage compartment 20 to guide the tube to the passage 40 and a curved guide passage 44 is similarly provided in the fiber storage compartment 22 for guiding the tube into the compartment 22. A strain relief is provided at the end of the guide passage 44 for the tube. This strain relief may be of any known construction, but as shown in FIG. 4 comprises a clip 46 for surrounding the tube and a screw 48 for securing the clip to the holder base 16.

To one side of the fiber storage compartment 22 is disposed an optical fiber splice block 50 of conventional construction. This splice block is permanently held in position either by being formed integrally with or otherwise secured to the base 16, and is spaced from an adjacent side wall 18. As can be seen from FIGS. 3 and 4, the guide passage 44 is positioned so as to align the end of the tubular member with the gap 51 between the splice block and the adjacent side wall 18 for reasons to be discussed.

Figure 3:
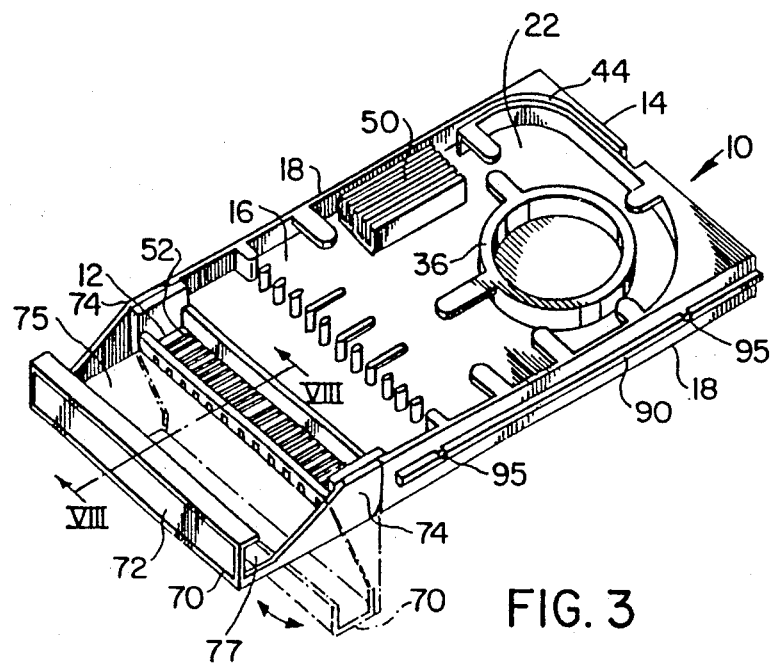
FIG. 3 is a view similar to FIG. 1 of the other side of the holder.

The mounting region 12 is contained between side walls 18 and is constructed to provide a plurality of connector mounting positions disposed in a series which extends from mounting position to mounting position across the front end region of the holder, i.e. between the side walls 18. The mounting region comprises a recess 52 extending between the side walls (see FIGS. 3 and 8). A base surface 54 of the recess provides a mounting surface for connectors to be disposed in the holder. As shown by FIG. 8, the surface 54 faces in the depth direction of the holder towards the general plane of the base 16. The mounting region is provided with a location and retaining means for locating and retaining connectors correctly in connector mounting positions along the mounting surface. The location and retaining means comprises a plurality of parallel grooves 56 formed in the surface 54, these grooves extending towards the rear end region of the holder and spaced apart along the mounting surface as shown in FIG. 3. The location and retaining means also comprises two opposing side surfaces 58 and 60 of the recess 52. The surface 58 is inclined onto recess 52 and spaced apertures 63 are formed in the base of the recess. The surface 60 overhangs the mounting region and apertures 65 are formed in the wall 67 having the surface 60. The apertures 63 and 65 are disposed in connector mounting positions along the mounting region (FIG. 3).

As shown in FIGS. 9 and 10, a connector mount 62 for mounting in the mounting region 12 is of substantially parallel-sided shape and has two ribs 64 on an undersurface which are spaced apart for location within two of the grooves 56 in the mounting surface. Such a connector mount may be disposed in any of the twelve desired mounting positions along the mounting region 12. From one end of the mount 62 there is provided an aperture 66 for accepting an optical fiber connector for fiber mounted in the storage compartment 20. The other end of the mount is formed as a square-sided recess 68 for receiving a connector of a patch cord to be optically coupled to one of the fibers contained in the storage compartment 20. The aperture 66 extends into recess 68. At the front end of the mount 62 and below the recess 68, a front surface is inclined, as shown to provide a forwardly projecting foot 69. At the rear of the mount, a resilient latch 71 is provided for flexing movement in a front to rear direction.

To position a mount 62 in the recess 52, the front of the mount is inserted into the recess so that the mount is inclined with the foot 69 extending into the aperture 65. The rear end of the mount is then forced downwardly and the free end of latch 71 engages the inclined surface 58 as to be flexed forwardly during downward movement until the latch passes through the aperture 63 and engages beneath a lower surface 73 of the holder 10. The mount is then in its mounted position as shown in chain-dotted outline in FIG. 8. In the mounted position, each mount overlaps the tube and fiber storage compartments 20 and 22 in the depth direction of the holder and does not extend beyond edges of side walls 18. The mount may be removed by raising the rear of the mount upwardly which causes the latch 71 to become released.

The holder is provided with a connector guard for preventing any injury to maintenance personnel from any light beam emitted from an end of an exposed connector mounted in any of the mounts 62. As shown in FIGS. 1 and 3, this guard 70 comprises a wall 72 which extends across the width of the holder, and two hinge projections 74 at the ends of the wall by which the guard 70 is hingedly mounted at the front ends of the side walls 18. The guard may be either in a raised and connector guarding position (in full outline) in a position in front of the mounting region or in a lowered or non-guarding position, as shown in chain-dotted outline in FIG. 3. With the guard in the raised position, the wall 72 is spaced forwardly from the mounting region and from the front end region of the holder as shown in the figures to define a space 75 to allow for passage of ends of patch cords from the front end region and into the space 74 to enable the patch cord connectors to be disposed in the mounts 62 provided in the mounting region 12. The guard is moved to the withdrawn position of FIG. 3 to enable the connections with the patch cords to be easily made by maintenance personnel. Each hinge projection 74 is cut away at a top edge to provide access opening 77 for passage of patch cords into the space 75.

Figure 11:
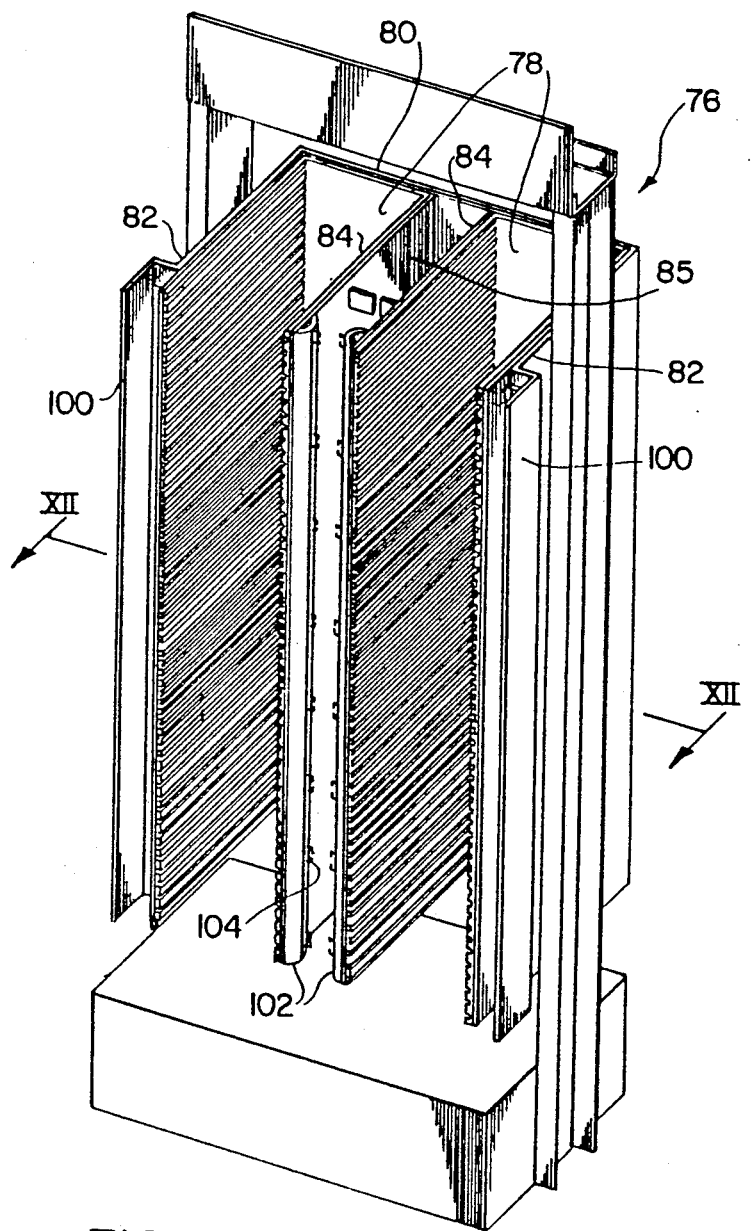
FIG. 11 is an isometric view of a distribution frame of the first embodiment.
Figure 12:
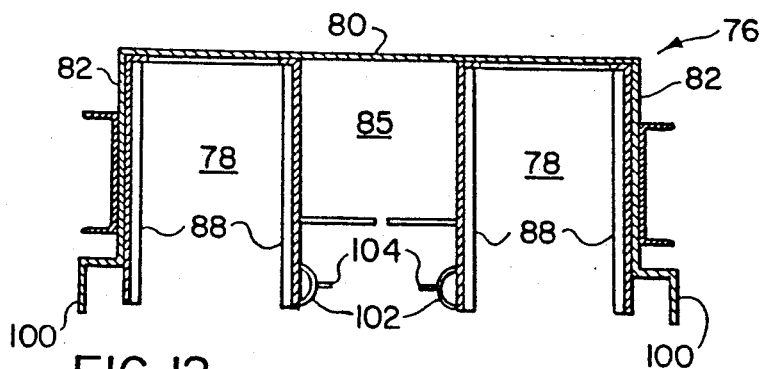
FIG. 12 is a cross-sectional view of the frame taken along line XII—XII in FIG. 11.

A plurality of the holders 10 together with a plurality of holders 10a of opposite hand to the holders 10 are to be assembled into a distribution frame 76 shown in FIGS. 11 and 12. The distribution frame and holder combination is intended for connecting the optical fibers of an incoming cable with distribution fibers of a customer's internal network. To this end, the frame 76 comprises two spaced apart banks of holder receiving stations 78. The frame comprises a rear wall 80 and two side walls 82 with each side wall 82 defining a vertical bank of stations 78 together with an intermediate wall 84 for that particular bank. The intermediate walls 84 are spaced apart as shown in FIG. 11 to provide a fiber storage channel 85 between the banks of receiving stations. Holder receiving stations in each bank comprise holder support flanges 86 (FIG. 17) which project inwardly of each bank from each side wall 82 and each intermediate wall 84 of that bank, the flanges 86 forming part of guide means for the holders 10.

Figure 17:
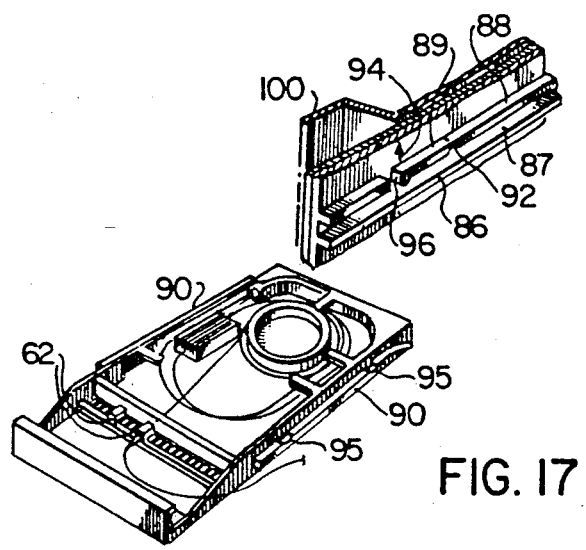
Figure 18:
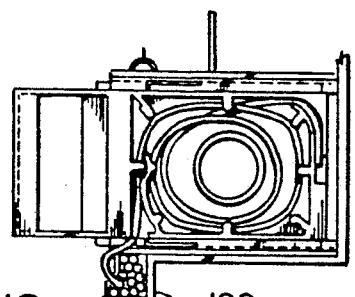

Each holder 10 or 10a and its corresponding side wall 82 and intermediate wall 84 is provided with part of the guide means in the form of a guide rail 90 projecting outwardly from each side wall 18 which lies vertically and extends laterally in the depth direction of the holder. Each guide rail 90 is received within a guide channel 87 defined between a respective flange 86 and a discontinuous flange 88 spaced above it (FIG. 17). Means is provided for receiving each holder 10 or 10a in the receiving station either in a rearward fully operative position or in a connector access position forwardly of the operative position. This particular means comprises, in respect of each wall 82 and 84, a latch 89 which normally forms part of the flange 88. Each latch is connected to a part of its flange 88 by a neck 92 and is not otherwise connected to its wall 82 or 84 so that it may be resiliently flexed upwards as shown by arrow 94 in FIG. 17. Each of the guide rails 90 is formed with two recesses 95 in spaced positions along the respective holder 10, these recesses being provided to accommodate a finger projection 96 at the free end of the latch 89.

As may be seen, the holder receiving stations are accessible from the front of the frame to slide the holders into the receiving stations. The guide rails 90 are received between the respective flanges 86 and 88 and a holder is pushed in the plane of the holder and along a straight line path in the rear to front direction of the holder towards the rear of the distribution frame. Movement of the rails 90 between the flanges 86 and 88 causes the latches 89 to be resiliently lifted as shown by the arrow 94 in FIG. 17, until the finger projections 96 are received within one of the recesses 95 of each rail 90 during resilient movement of the latches 89 to their lower horizontal positions. With the projections 96 in the forward recesses 95 of the respective holder, the holder is in the rearward fully operative position, of the frame. To move a holder into the forward connector access position the holder is pulled forwardly manually which raises the latches 89 until the fingers engage the respective recesses 95 towards the rear of the holder.

On the outside of the distribution frame, i.e. on the outside of each side wall 82, a forward facing vertical channel 100 is provided at the front of the frame (FIGS. 11, 12 and 17). Each channel is for receiving a group of tubular members containing optical fibers. Between the intermediate walls 84 on each wall at its forward edge is provided a convex surface member or arcuate channel 102 presenting a convex surface into the region between the walls 84. The channel 102 forms part of a patch cord positioning means. At spaced intervals along each channel 102 are provided corralling hooks 104 of the positioning means for patch cords extending between the two banks. It is intended that the left-hand bank 78 of receiving stations is to be connected to the incoming optical fibers of incoming cable and the right-hand bank to the distribution optical fibers. The optical fiber connections and assembly of the holders into the distribution frame is performed in the following manner.

Figure 13:
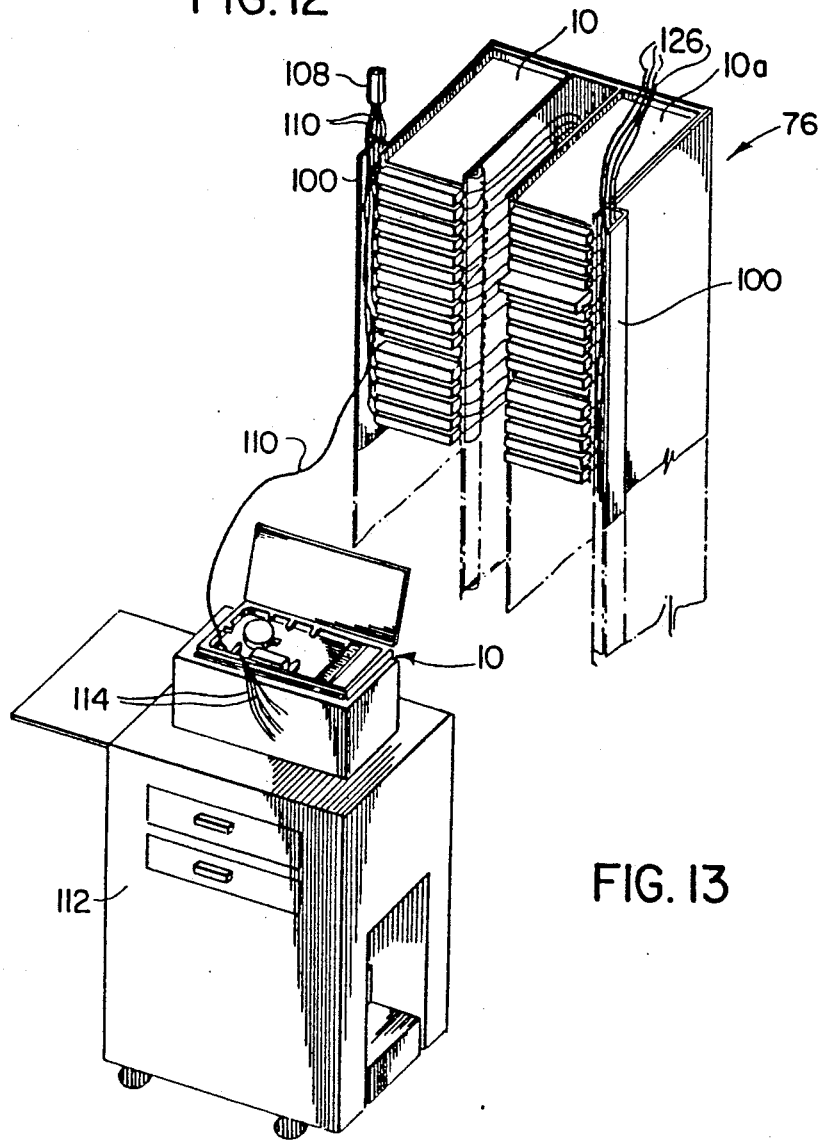
FIG. 13 is an isometric view of a partial assembly of the distribution frame and a plurality of holders according to the first embodiment.

As shown in FIG. 13, an incoming optical cable 108, comprising a plurality of tubes 110 each surrounding a group of incoming optical fibers, is secured in a position above the channel 100 on the left-hand side of the distribution frame. Prior to its location in position, the jacket and any sheath of the cable surrounding the tubes 110 has been removed and the tubes are disposed so as to extend down the left-hand channel 100 as shown in the figure.

Figure 14:
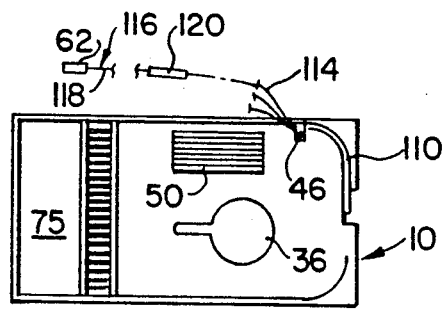
FIGS. 14, 15, 16, 17 and 18 are views showing stages in the assembly of optical fibers in a connector holder and the holder into the frame of the first embodiment.
Figure 15:
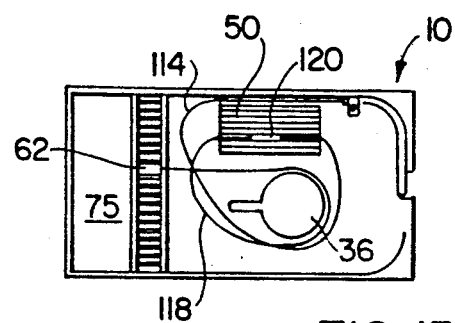

To connect a holder 10 to fibers of the cable at any of the holder receiving stations in the left-hand bank 78, the holder 10 is disposed in front of the frame on a supporting structure such as a work table 112. A selected one of the tubes 110 is then brought forwardly from the frame and an end length of the tube is removed to expose excess lengths of the group of fibers 114 housed within the tube. The fibers 114 have a diameter of approximately 0.25 mm. In this particular case where the holder is to accommodate twelve optical connectors at its mounting region, then there are twelve optical fibers 114 in the tube. As shown in FIG. 14, an end region of the tube 110 is then located along the curved guide passage 44 on the fiber storage compartment side of the holder and the end of the tube is secured to the holder by the strain relief clip 46. In this position, all of the excess lengths of the fibers 114 extend loosely outwardly from the end of the tube. Each of the fibers is then connected to a pigtail 116. Each pigtail comprises an optical connector housed within a connector mount 62 and a length of optical fiber 118 extending from the connector. Each fiber 114 is connected to a corresponding fiber 118 by a splice 120, as shown in FIG. 14, by a splicing operation performed outside the holder upon the table 112, the splice then being placed directly after its formation in an appropriate position in the splice block 50. After location of each splice in the splice block excess lengths of the corresponding fibers 114 and 118 are wound into coils around the cylinder 36 in the fiber storage compartment 22 and the connector mount 62 is disposed in a desired mounting position in the mounting region 12 as shown in FIG. 15. In this figure, for clarity, only one splice connection together with pigtail 116 and corresponding fiber 114 is shown. This connection procedure is then followed with each of the remaining optical fibers 114 and corresponding pigtails 116 until the splicing operation is finalized and connector mounts 62 have been located in their mounting positions in the holder.

Figure 5:
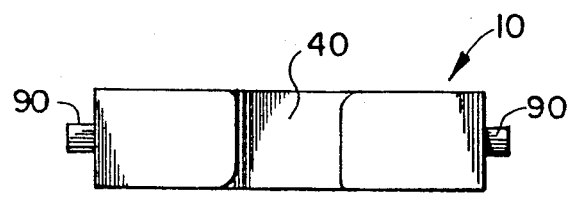
FIG. 5 is an end view of the holder in the direction of arrow V in FIG. 4.
Figure 16:
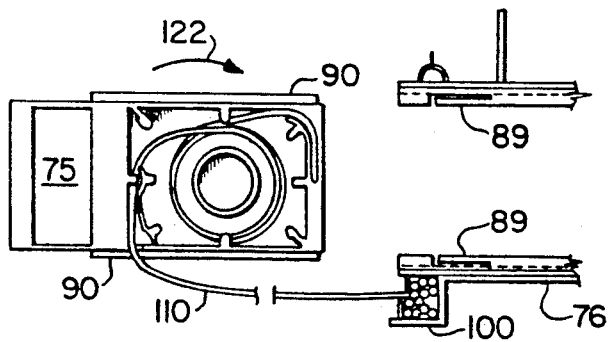

The holder 10 is then removed from the supporting table 112 and the tube 110 is caused to pass through the passage 40 (FIG. 5) to bring it into the tube storage compartment 20. With the cup 32 raised to its position shown in FIG. 6, the length of tube extending from the table 112 to the distribution frame is wound into coils around the cylindrical part 31 of the cup accompanied by rotation of the holder in its own plane, as indicated by arrow 122 in FIG. 16, to effect the coiling action. Upon the holder reaching its desired holder receiving station on the left-hand side of the frame, the tube 110 is caused to pass through the inlet opening 24 in the side wall 18, as shown in FIG. 16, and the holder with the tube storage compartment 20 facing downwardly, is moved into its rearward fully operative position by sliding reception of the guide rails 90 between the corresponding flanges 86 and 88. In the fully operative position of the holder, the finger projections 96 of the associated latches 89 are received within the forward recesses 95 of the holder. After completion of the coiling operation, the sliding movement of the holder into the frame is accompanied by appropriate change in the size of the coils of the tube 110 in the tube storage compartment 20 as the inlet 24 of the holder approaches towards the channel 100 accommodating the tubes 110. This is because any further excess length of tube extending from the holder is progressively received through the inlet 24 into the tube storage compartment 20 during reception of the holder into the frame.

All of the other tubes 110 are then connected to associated holders 10 in a similar fashion with their optical fibers connected to pigtail assemblies and with the connector mounts 62 located in the mounting positions. These holders are then positioned in the left-hand bank of holder receiving positions as required.

Holders 10a of opposite hand to the holders 10 are then dealt with sequentially to splice optical fibers 128 of pigtails to optical fibers of a customer's internal network housed within distribution tubes 126 housed in the right-hand channel 100 (see FIG. 13). These fibers are spliced together in the manner described for the holders 10 and the holders 10a are inserted into the right-hand bank of holder receiving stations 78 by rotation of each holder to accommodate the excess lengths of the tubes 126 in the tube storage compartments.

Figure 19:
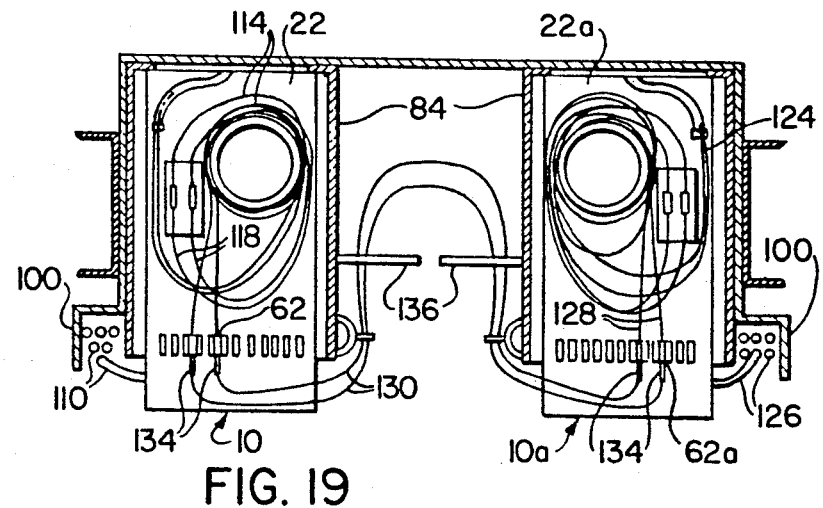
FIG. 19 is a cross-sectional view of the frame and holder assembly along line XII—XII in FIG. 11.
Figure 20:
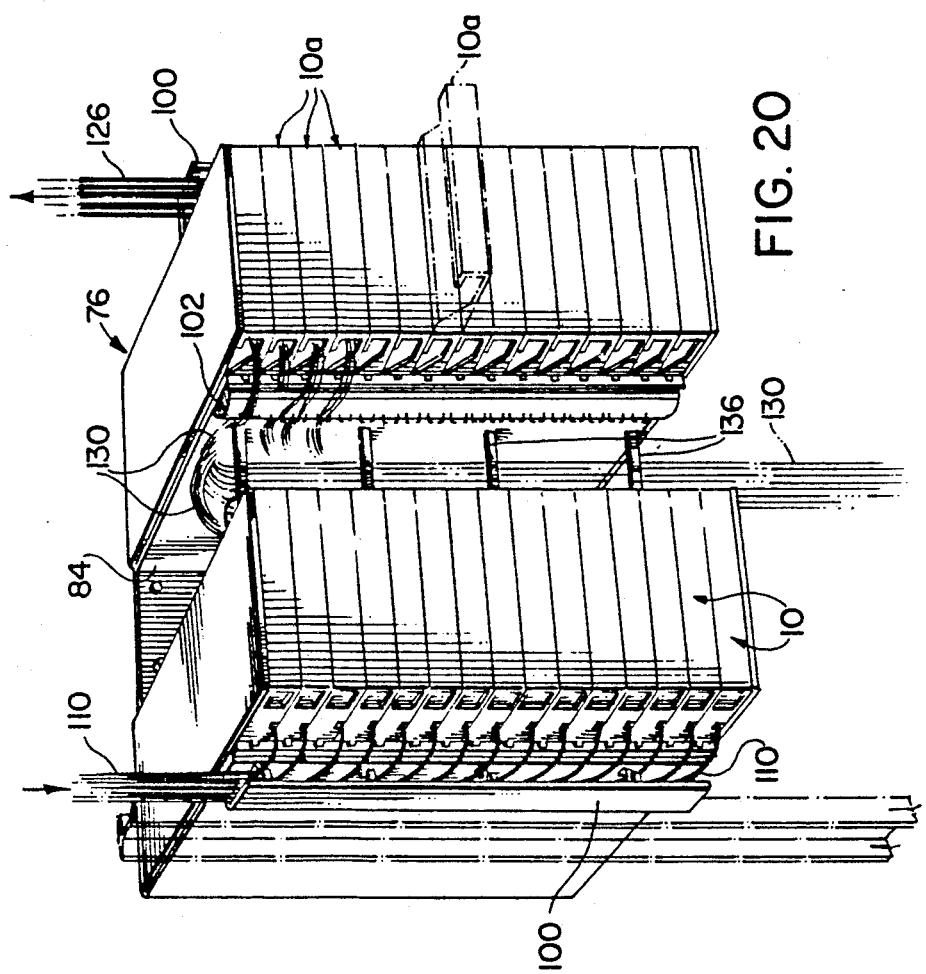
FIG. 20 is an isometric view of part of the frame and holder assembly.

In the finished assembly of the holders 10 and 10a into their stations 78 and as shown by FIGS. 19 and 20, the tubes 110 are hence connected to the rear end of the connectors in mounts 62 of the holders 10. In the holders 10a, outgoing or distribution fibers 124 from the tubes 126 are coiled in the fiber storage compartments 22a to be spliced to the pigtails with the splices located in the splice blocks 50 of the holders 10a. The connectors joined to the fibers 128 of the pigtails are held in connector mounts 62a which are mounted into the mounting regions of the holders 10a.

It follows that the left-hand bank of receiving stations 78 housing the holders 10 is the incoming telecommunication cable side of an interfacial region in the distribution frame while the right-hand bank of receiving stations housing the holders 10a is on the outgoing or customer's internal network side of the frame side and is connected directly to the distribution optical fibers of that network. In each bank, with all holders in their fully operative positions, all of the connector guards 70 are in guarding positions and collectively form a substantially continuous connector guard wall at the front of the frame as shown in FIG. 20.

It is a simple matter to selectively connect any of the connectors in mounts 62 with any of the connectors in mounts 62a by the use of patch cords 130 each comprising a tube protected fiber (not shown) and connectors 134 at each end. Selection is made by drawing out, to their forward access positions, selected holders 10 and 10a in the two banks. To reach their access positions, the selected holders are drawn forward until their respective latches 89 engage in the rearward recesses 95 on guide rails 90. After pivoting the guards 70 downwards to their non-guarding positions (the chain-dotted positions in FIG. 3), the connectors 134 of a patch cord are connected to a desired connector in a mount 62 with the front end of another selected connector in a mount 62a. An access position of one holder 10a is shown, by way of example, by the chain-dotted position in FIG. 20.

To avoid confusion and difficulty during maintenance or position changing of patch cord, it is considered to be desirable not to have the fibers or tubes extending forwardly from the distribution frame and holder assemblies. This problem is partly overcome by the tubes 110 and 126 being controlled within the channels 100 and extending directly into the inlets 24 to the tube storage compartments (see FIGS. 19 and 20), these inlets being adjacent to the channels 100 when the holders are in their fully operative positions. In addition, each of the patch cords 130 is disposed in controlled fashion between its connectors 134 by being located in the storage channel 85 between the side walls 84 as shown in FIGS. 19 and 20. Each of the groups of patch cords is passed substantially horizontally around the arcuate channels 102 so as to control their minimum bend radius, through the corralling hooks 104 on each wall 84 and then passes rearwardly between the side walls 84 to be located over and behind patch cord loop supporting brackets 136 of the positioning means. These brackets 136 extend between the side walls 184 and have ends slightly spaced apart for passage of the pigtails. Each of the patch cords then extends freely downwardly in a loop 132 behind the brackets 136 to accommodate any excess length of the patch cord.

As may be seen from the above description, each of the holders 10 or 10a may be of compact size while still enabling a multiplicity of fibers to be connected to connectors in the holder. As described in the first embodiment there are twelve connector mounting positions for each holder and this large number of mounting positions is only made possible in the compact size of holder by providing the mounting region at the front end region of the holder so as to lie in the same holder width region as the fiber and tube storage compartments 20 and 22, i.e. the two compartments lie between the mounting region and the rear end 14 of the holder. In other words, the holder does not require additional width to that required for the storage compartments in order to accommodate the connector mounting region. Hence, the width of the holder is minimized while maximizing on the number of connectors which may be mounted in the holder. In addition to this, the holder length is minimized in that the two compartments 20 and 22 lie side-by-side through the depth of the holder as distinct from lying side-by-side in the length or width of the holder.

Further to this, the depth of the holder is also minimized in that the connector mounts 62 and thus the connectors lie in the same planes of the holder as the compartments themselves. Hence, the depth of the holder does not extend beyond the lateral width of side walls 18. With the holder size minimized in this manner, each holder need only be 11.8 inches long by 5.4 inches wide by 0.88 inches deep, while providing the advantages of the first embodiment. As a result, a distribution frame 76 measuring 84 inches deep by 26 inches wide, may accommodate sixty holders in each bank for a total of 1440 connectors at the front regions of the holders in both banks. Hence, a total of 720 incoming fibers may be connected from one bank to the other and into the customer's internal network.

Another advantage in this arrangement is that the tube storage compartment 20 in being completely separate from the fiber storage compartment 22 enables the tube to move within its compartment, during movement of the holder into and out of the fully operative position, without engaging and abrading against the bare fibers in the tube storage compartment. Also, any holder may be completely removed from the frame and placed on the work table 112 by removal of its tube from the holder by an uncoiling action without any movement or possible damage occurring to the fibers in the fiber storage compartment 22. Hence, damage to the coiled lengths of fiber by the coiled tube is avoided under any circumstances.

The above dimensions of 84 inches by 26 inches for the distribution frame of the first embodiment may be reduced in a case where a frame is not used for the purpose of having an incoming bank and an outgoing bank. In particular, the holders 10 and 10a may be used quite effectively in a frame which deals exclusively with incoming optical fibers from an incoming cable.

Figure 21:
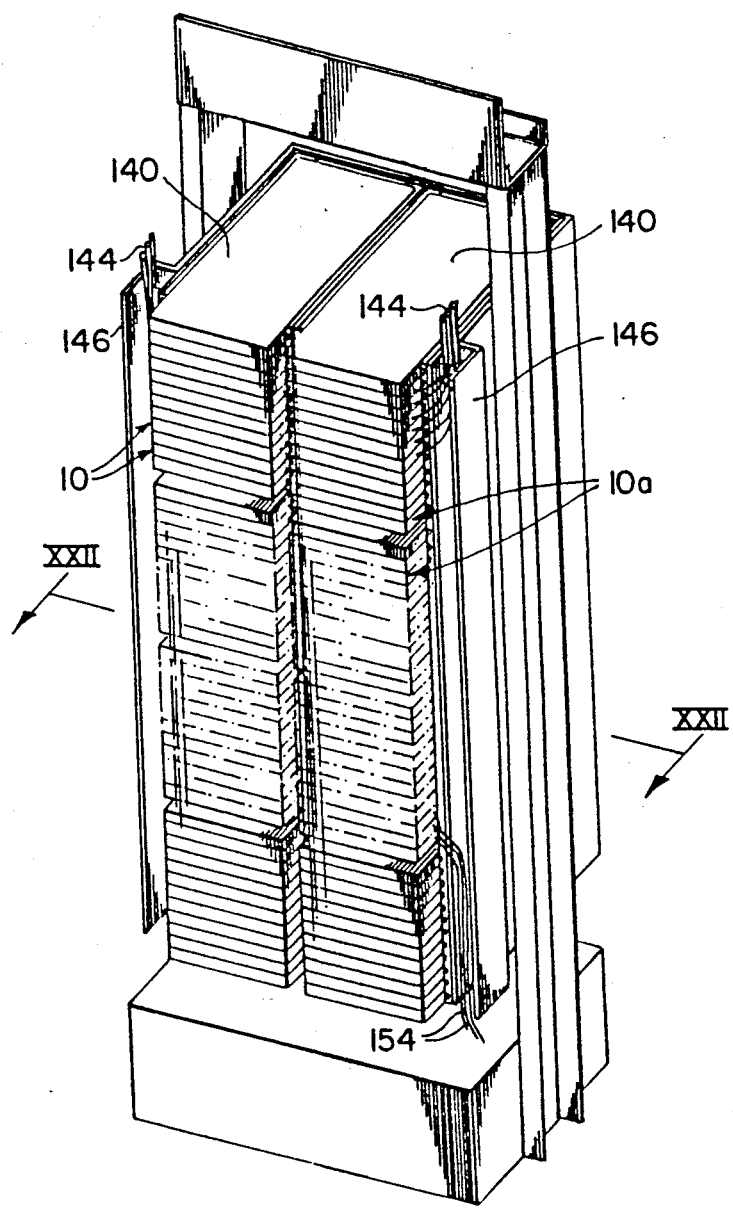
FIG. 21 is an isometric view of a frame and holder assembly according to a second embodiment.
Figure 22:
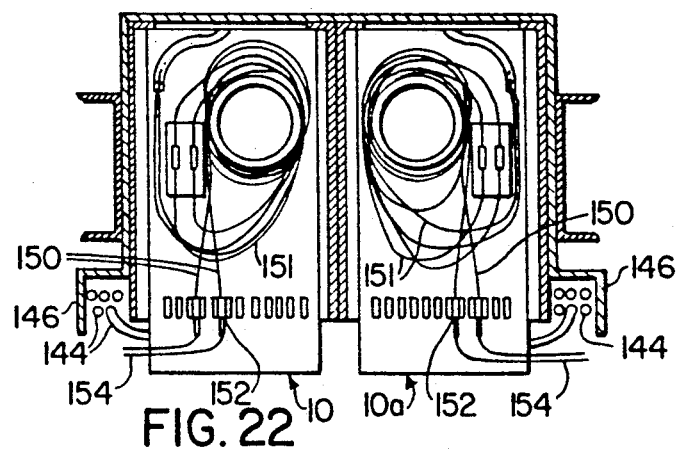
FIG. 22 is a cross-sectional view of the frame and holder assembly of the second embodiment taken along line XXII—XXII in FIG. 21.

In such a frame as is exemplified in a second embodiment shown in FIGS. 21 and 22, two banks 140 of holders 10 and 10a are disposed closely adjacent so as to avoid the storage channel between side walls 84 as described in the first embodiment. In the second embodiment each of the holders 10 and 10a is slidably moved in its own plane into the frame and into its respective holder receiving position in a manner similar to that described in the first embodiment. However, in the second embodiment the two banks of holders are separated solely by the thickness of a wall 142, the wall being provided solely for the purpose of supporting the guide rails for the holders.

In the second embodiment, incoming optical fiber tubes 144, from the same incoming cable extend along vertical channels 146 which lie at the front of and open at the front of the frame. Each tube is received in its tube storage compartment of its own holder 10 or 10a as described for the tubes in the first embodiment and the incoming optical fibers 151 extend into the respective fiber storage compartment to be spliced to pigtail fibers 150 as shown in FIG. 22. The pigtail fibers 150 form part of pigtails having connectors mounted in connector mounts 152 which are held in the mounting regions of the holders 10 and 10a as described in the first embodiment. Patch cords 154 from both banks of holders then extend outwardly from the distribution frame as shown in FIG. 22. These patch cords may themselves extend along the channels 146 before continuing to another or other distribution frames where they are connected to the customer's internal network side of the interface with the incoming cable. As shown in FIG. 21, the patch cords conveniently may extend downwardly of and away from the bottoms of the channels. Such an arrangement need only have a distribution frame width of about 17.3 inches to perform its function while providing for a total of 1440 fiber connections.

Figure 23:
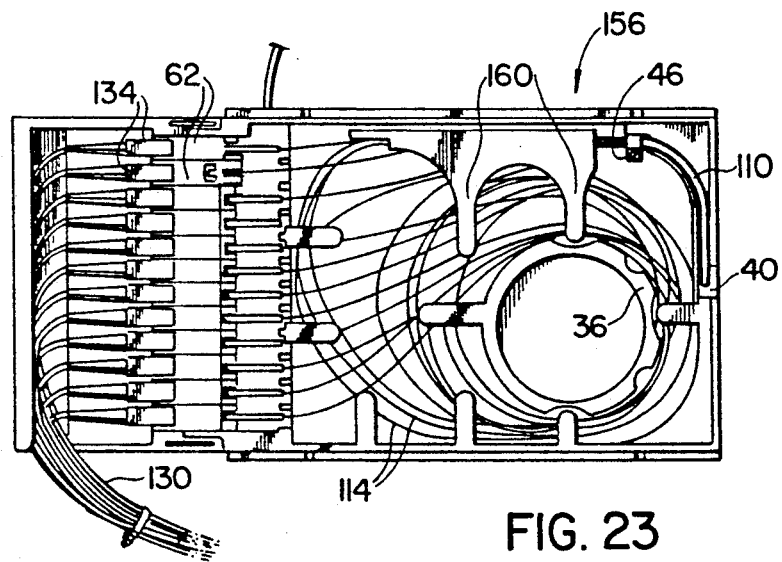
FIG. 23 is a plan view of one side of a connector holder according to a third embodiment.

While the above description relating to the first two embodiments has included the use of splice blocks secured to the holders 10 and 10a, it is possible for incoming optical fibers to be connected directly into the connectors held by the mounts in the mounting regions of the holders. With reference to FIG. 23 wherein the same reference numerals are used in the first embodiment for substantially identical parts, a holder 156 of a third embodiment is substantially of the same construction as that described in the first embodiment except that the splice block is omitted. The incoming tube 110 extends from the coils in the tube storage compartment (not shown) through the passage 40 between the two compartments so as to be held by the strain relief clip at its end in the storage compartment. The incoming optical fibers 114 then extend in coiled form around the cylinder 36 and are passed to the connectors held by the mounts 62 held in the mounting region 12 of the holder. As may be seen from FIG. 23, additional retaining flanges 160 may be required for the purpose of holding the fibers within the storage compartment.

As described in the embodiments each holder 10 and 10a will accommodate twelve connector mounts 62. However, it is possible that connectors of sizes other than those which will fit within the mounts 62 to enable the use of twelve mounts to a holder, may wish to be used. In this case and in an alternative structure (not shown), the whole of the mounting region of the holder may be detachable in any desired manner. The mounting region is formed for this purpose as a separate molded element. In one construction, the mounting regions has dovetail ends. These dovetail ends are received within complementary dovetail slots provided at the forward ends of the arms 18 of the holder. The mounting region is urged downwardly between the arms to locate it in position within the holder. For accommodating larger or smaller connector mounts than those described above, the mounting region is replaceable by other mounting regions having the parallel grooves 56 of the location and retaining means spaced closer together or further apart as is appropriate.

While the above embodiments are described in relation to connection of small diameter incoming fibers contained within tubes of a cable, to connectors, alternatively, cables having larger diameter fibers (e.g. around 0.9 mm) which are not contained in tubes may be connected through the distribution frame and holder assemblies. In such cases, groups of incoming fibers are directed to each holder receiving station of the frame and are coiled, as a group, around the tube storage compartment 20. These incoming fibers then extend into the fiber storage compartment 22 to be held by the strain relief clip 46 before proceeding either to the splice block 50 or directly to individual connectors mounted in the mounts 62.

What is claimed is:

1. A planar connector holder for holding terminal connectors for optical fibers, the holder having:
   a front end region, a rear end region remote from the front end region, and sides extending from the front end region to the rear end region;
   a storage facility for the storage of a plurality of coiled lengths of fiber with the fiber with the fiber coils in planes of the holder, the storage facility lying between the sides of the holder;
   means in the storage facility for limiting the minimum bend radius of the associated optical fiber coils;
   a mounting region for a plurality of optical terminal connectors, the mounting region disposed at the front end region of the holder with the storage facility directly disposed between the mounting region and the rear end region of the holder with the mounting region comprising a plurality of connector mounting positions disposed in a series which extends, from mounting position to mounting position along the front end region of the holder for location of terminal connectors in the mounting positions with an end of each connector facing forwardly from the front end region of the holder; and
   a connector guard pivotally movable into and out of a connector guarding position, in which it is located forwardly in front of the mounting region to provide a space between the guard and the mounting region for passage of optical fibers, the guard being movable from the guarding position to allow for access from a position in front of the mounting region, to said forwardly facing ends of the connectors when in their mounting positions.

2. A planar connector holder according to claim 1 wherein said holder is provided at the sides with side walls which extend longitudinally of the sides, each side wall defining an outer limit to the storage facility and having a lateral direction which extends in a depth direction of the holder normal to the plane of the holder, and each side wall is provided with longitudinally extending guide means.

3. A planar connector holder according to claim 2 wherein the storage facility has tow means for limiting the minimum bend radius of optical fiber coils, the two means being separated so as to limit the bend radius of two sets of coils with each set at a different location int he facility.

4. A planar connector holder according to either claim 1 or claim 3 having means by which a strain relieve may be applied to optical fibers or to an optical fiber carrying tube.

5. A planar connector holder according to claim 2 wherein each guide means comprises a guide rail projecting outwardly from the respective side wall.

6. A planar connector holder according to claim 2 comprising a planar base extending between front and rear end regions;
   wherein the storage facility comprises a first storage compartment on one side of the base and a second storage compartment on the other side of the base, the storage compartments for storing two sets of coils of fiber, one set to each compartment, with the compartments being interconnected to enable fibers to extend along a path from one compartment to the other to be optically coupled with optical terminal connectors mounted in the mounting region, means by which strain relief may be applied to optical fibers or to a tube carrying optical fibers;
   and wherein means is provided in each compartment for limiting the minimum bend radius of the associated coils with the means by which the strain relief may be applied disposed between the two bend radius limiting means along the path of the fibers;
   the mounting region being interconnected with the second compartment which is disposed between the mounting region and the rear end region of the holder, the mounting region having a mounting surface for mounting terminal connectors, the mounting surface extending along the front end region of the holder and having location and retaining means for locating and retaining terminal connectors in the mounting positions; and
   the mounting surface lying on one side of the general plane of the base and facing towards the general plane of the base.

7. A planar connector holder according to claim 6 wherein said location and retaining means comprises à plurality of location grooves formed in the mounting surface, the grooves oriented to extend towards the rear end region, while being spaced along the front end region of the holder.

8. A planar connector holder according to claim 7 wherein the mounting region comprises a recess lying to said one side of the base and extending along the front end region of the holder with the mounting surface forming a base surface of the recess, the location and retaining means also comprising two opposing side surfaces of the recess with one of the side surfaces overhanging the mounting surface.

9. A planar connector holder according to claim 6 wherein the holder comprises a main body and a front portion which is detachably mountable upon the main body, the front portion having the mounting region for the connectors.

10. A planar connector holder according to claim 6 provided with an optical fiber splice block which is disposed, laterally of the holder, at one side of the second storage compartment and the splice block is also disposed between the side walls and directly between the mounting region and the rear end region of the holder.

11. A planar connector holder according to claim 1 wherein at the mounting region there is provided a mounting surface for mounting terminal connectors, the mounting surface extending along the front end region of the holder and having location and retaining means for locating and retaining terminal connectors in mounting positions.

12. A planar connector holder according to claim 11 wherein said location and retaining means comprises a plurality of location grooves formed in the mounting surface, extending towards the rear end region and laterally spaced along the front end region of the holder.

13. A planar connector holder according to claim 11 wherein the mounting region comprises a recess extending along the front end region of the holder with the mounting surface forming a base surface of the recess, the location and retaining means also comprising two opposing side surfaces of the recess with one of the side surfaces overhanging the mounting surface.

14. A planar connector holder according to claim 1 provided with a plurality of optical terminal connectors detachably mounted in the mounting region and disposed laterally of one another along the front end region of the holder with each connector having a rear end facing towards the rear end region of the holder and a front end facing outwardly from the front end region of the holder and a group of optical fibers extending in coiled lengths in the storage facility, each of the fibers optically coupled to the rear end of a respective optical connector mounted in the mounting region.

15. A planar connector holder according to claim 1 wherein the connector guard defines an access at a side of the guard for passage of optical fibers into the space.

16. A method of optically coupling a group of incoming optical fibers to optical terminal connectors and locating the fibers and connectors in a distribution frame having a front and a rear comprising:
directing the group of fibers to cause it to extend from the frame to a planar connector holder for optical terminal connectors, the holder disposed in a position spaced from the distribution frame and having front and rear end regions remote from each other;
at a position spaced from ends of the fibers in the group, disposing the group of fibers in a fixed location on the holder by passing the group through a strain relief to provide end portions of the fibers extending from one side of the strain relief and lengths of the group of fibers extending from the other side of the strain relief to the distribution frame;
optically coupling ends of the fibers of the group to the optical connectors;
mounting the connectors in an array disposed along the front end region of the holder and in the plane of the holder;
forming the fiber extending from the connectors into coils in a storage facility of the holder, the storage facility disposed directly between the array of connectors and the rear end region of the holder;
moving the holder towards the distribution frame while forming the lengths of the group extending form the strain relief to the distribution frame into coils in the storage facility;
and moving the holder into a receiving station in the distribution frame with the front end region of the holder at the front of the frame.

17. A method according to claim 16 comprising forming the fibers extending from the connectors into coils in a first storage compartment of the storage facility;
passing said lengths extending from the strain relief to the distribution frame to a second storage compartment of the storage facility and forming said lengths into coils in said second storage compartment.

18. A method according to claim 17 comprising directing the group of fibers to the holder with the group contained within a tube and with a length of tube containing said length of fibers extending from the strain relief to the frame, securing a portion of the tube in the strain relief with said end portions of fibers extending from the tube, and passing the length of tube to the second storage compartment and forming said length of tube into coils in the second storage compartment to form the coils of the lengths of the group of fibers in the second compartment.

19. A method according to claim 18 wherein, after securing the tube into the strain relief, the method comprises:
splicing end s of said end portions of the incoming fibers to ends of pigtail fibers of pigtails which also have the optical terminal connectors at the other ends of the pigtail fibers;
and forming the pigtail fibers and the end portions of the incoming fibers into coils in the first storage compartment and mounting the connectors in the array before moving the holder towards the distribution frame and forming the tube into coils in the second compartment.

20. A method according to claim 16 wherein the distribution frame comprises two bands of receiving stations, the method comprising:
optically coupling a plurality of groups of incoming fibers to optical connectors in a plurality of the holders forming a first set of holders;
moving the holders of the first set into respective receiving stations in one bank in the frame;
coupling a plurality of distribution optical fibers to optical connectors in a plurality of the holders forming a second set of holders;
moving the holders of the second set into respective receiving stations in the other bank in the frame;
and selectively optically coupling individual connectors of one set with individual connectors of the other set by means of patch cords extending into a channel disposed between the banks of receiving stations.

21. A method according to claim 20 comprising:
passing each end of each patch cord outwardly from its respective holder by causing it to emerge from a face of the set of holders which is directed towards the channel and towards the other set of holders;
disposing each patch cord towards the rear of the distribution frame and at each side of the channel by locating it through a corralling ring at the side of the channel;

and causing an excess length of each patch cord to hang in a loop in the channel over a loop forming bracket rearwardly in the frame of the corralling ring.

22. A planar connector holder for holding terminal connectors for optical fibers, the holder having:
- a front end region, a rear end region remote from the front end region and side walls extending from the front end region to the rear end region;
- a mounting region for a plurality of optical terminal connectors, the mounting region disposed at the front end region of the holder and comprising a plurality of connector mounting positions disposed in a series which extends, from mounting position to mounting position along the front end region of the holder for location of terminal connectors in the mounting positions with an end of each connector facing forwardly from the front end region of the holder;
- a storage facility for the storage of a plurality of coiled lengths of fiber in planes of the holder, the storage facility comprising a first storage compartment and a second storage compartment for storing two sets of coils of fiber, one set to each compartment, with the side walls defining outer limits to each storage compartment, the first storage compartment being provided for storage of a tube containing incoming optical fibers and comprising a tube retainer which is movable between an inner operative position to prevent removal of coils of tube from within the first storage compartment and an outward position to permit removal of coils, the first and second storage compartments being interconnected by an interconnecting channel, an inlet being provided to the first storage compartment, and the mounting region interconnected with the second compartment which is disposed between the mounting region and the rear end region of the holder;
- and means in the storage facility for limiting the minimum bend radius of he associated coils.

23. A planar connector holder according to claim 22 wherein the inlet is disposed adjacent the mounting region.

24. A planar connector holder according to claim 22 wherein the inlet to the first storage compartment is formed in a side wall of the holder and is open at an edge of the side wall.

25. A planar connector holder according to claim 24 wherein the interconnecting channel between the first and second storage compartment opens at the far end region of the holder.

26. An apparatus, comprising, in combination:
- a plurality of planar connector holders for connecting a plurality of groups of incoming optical fibers of an incoming optical fiber cable to outgoing optical fibers, each aid holder having:
- front and rear end regions remote from each other and sides extending from the front to the rear end regions;
- a storage facility for the storage of a plurality of coiled lengths of incoming fiber with the fiber coils in planes of the older, the storage facility lying between the sides of the holder;
- means in the storage facility for limiting the minimum bend radius of the associated coils; and
- a mounting region for a plurality of optical terminal connectors, the mounting region disposed at the front end region of the holder with the storage facility directly disposed between the mounting region and the rear end region of the holder, the mounting region contained between the sides and mounting said optical terminal connectors in an array along the front end region of the holder and in the plane of the holder, each of said terminal connector being oriented with one end facing forwardly at the front end region of the holder so as to be accessible from said front end region and such that outgoing optical fibers attached to said one ends of said connectors extend generally in a forward direction, the terminal connectors also having rearwardly facing ends optically connected to the incoming fibers; and
- a frame having a front and a rear and having a plurality of holder receiving stations extending from said front to said rear, each said receiving station having front access for slidably receiving an associated holder to support said associated holder in a first position fully received in said receiving station with said rear end region of the associated holder in the rear of said frame and the front end region of the associated holder in the front of said frame, a second position slidably displaced form said first position in which said associated holder front end region protrudes slightly from said front for facilitating access to said terminal connectors from the front of said frame, and a third position slidably displaced form said second position in which said associated holder front end region protrudes further form said front to facilitate access to said mounting region.

27. A combination according to claim 26 wherein the groups of incoming optical fibers extends one to each receiving station and to the holder in said receiving station and for each holder:
- the storage facility comprises a first storage compartment and a second storage compartment, the compartments being interconnected;
- means is provided in each compartment for limiting the minimum bend radius of the associated coils; and
- the associated group of incoming optical fibers extends in coiled form around the minimum bend radius limiting means in the first compartment, passes through a strain relief and is then optically coupled to the optical terminal connectors by optical fiber coils extending around the minimum bend radius limiting means in the second compartment.

28. A combination according to claim 27 wherein each holder has a holder base extending between the front and rear end regions in the plane of the holder with the compartments being spaced apart one on each side of the holder base and opposed to one another in a depth direction normal to the plane of the holder.

29. A combination according to claim 28 wherein each holder is provided with a plurality of connector mounts with each optical terminal connector held by an individual mount, and wherein at the mounting region there is provided a mounting surface extending along the front end region of the holder and having location and retaining means for locating and retaining the terminal connectors in their mounts in specific locations, said location and retaining means providing the mounting positions and positioning and retaining the individual mounts in the mounting positions.

30. A combination according to claim 29 wherein each holder base is generally planar and the mounting surface lies on one side of the general plane of the holder base and faces towards the general plane of the base with the connector mounts overlapping the two compartments in the depth direction of the holder.

31. A combination according to claim 30 wherein the location and retaining means of each holder comprises a plurality of location grooves formed in the mounting surface and extending towards the rear end region and laterally spaced along the front end region of the holder and each connector mount has one surface provided with at least one groove engaging projection for locating the mount in a desired position along the mounting surface.

32. A combination according to claim 31 wherein, in each holder, the mounting region comprises a recess extending along the front end region of the holder with the mounting surface forming a base surface of the recess, the location and retaining means also comprising two opposing side surfaces of the recess with one of the side surfaces overhanging the mounting surface, and each connector mount extends across the mounting surface to engage both side surfaces while extending between the overhang and the mounting surface to retain the connector mount in its mounting position.

33. A combination according to claim 28 wherein each holder is provided with an optical fiber splice block which is disposed, laterally of the holder, to one side of the second compartment, an the splice block is also disposed directly between the mounting region and the rear end region of the holder, and wherein the connectors each form part of a pigtail having a pigtail optical fiber extending from the connector and each incoming optical fiber extends to and is spliced in the splice block to a respective pigtail optical fiber which extends in coiled form around the second compartment.

34. A combination according to claim 33 wherein each group of incoming optical fibers is contained within a tubular member of the incoming optical cable and each tubular member extends in coiled form around the minimum bend radius limiting means in the first compartment, passes through and is held by the strain relief and the incoming optical fibers then extend from an end of the tube into the second compartment and are spliced in the splice block to their respective pigtail optical fibers.

35. A combination according to claim 27 wherein each holder comprises a main body and a front portion which is detachably mountable on the main body, the front portion having the mounting region for the connectors.

36. A combination according to claim 27 wherein each group of incoming optical fibers is contained within a tubular member of the incoming optical cable and each tubular member extends in coiled form around the minimum bend radius limiting means in the first compartment, passes through and is held by the strain relief and the incoming optical fibers then extend from an end of the tube into the second compartment.

37. A combination according to claim 27 wherein the holder receiving stations are provided in two side-by-side banks with the holder receiving stations in each bank lying side-by-side an the incoming optical fibers extend to receiving stations in each row.

38. A combination according to claim 27 wherein said plurality of holder receiving stations are disposed side-by-side in a first bank with the plurality of connector holders disposed within the first bank of receiving stations being a first set of holders, the combination also comprising another plurality of side-by-side holder receiving stations disposed in a second bank with the two bank parallel, and another plurality of the planar connector holders providing a second set disposed within the receiving stations of the second bank and a plurality of groups of distribution optical fibers extending one group to each of the holder receiving stations of the second bank; wherein in each holder of the second set the first storage compartment houses a corresponding group of distribution optical fibers in coiled form with the coils in planes parallel to the plane of the holder and the distribution optical fibers are optically coupled to a plurality of optical terminal connectors mounted in the mounting region of the holder of the second set; and wherein the outgoing fibers are provided by patch cords which extend selectively from optical terminal connectors of the first set of holders to optical terminal connectors of the second set of holders.

39. A combination according to claim 38 wherein, each holder of each set is provided with an optical fiber splice block which is disposed, laterally of the holder, to one side of the second compartment, and each splice block is also disposed directly between the mounting region and the rear end region of its respective holder and wherein, in each set of holders, the optical connectors each form part of a pigtail having a pigtail optical fiber extending from the connector with the pigtail optical fibers extending in coiled form around their respective second storage compartments, the pigtail optical fibers in the first set of the holders being spliced in corresponding splice blocks to respective incoming optical fibers and the pigtails in the second set of holders being spliced in corresponding splice blocks to respective distribution optical fibers.

40. A combination according to claim 38 wherein the two banks of receiving stations are horizontally spaced apart to provide a forwardly opening vertical storage channel for fiber between the hanks and the patch cords extending from the one set to the other set of holders pass into the storage channel and a patch cord positioning and control means is provided within the channel and which holds and contains the patch cords in the channel.

41. A combination according to claim 40 wherein each set of holders has a face facing laterally away from the other set and outwardly of the frame, and another face directed towards the channel and towards the other set and the patch cords emerge from the holders by extending from said another face.

42. A combination according to claim 41 wherein the patch cord positioning and control means comprises a convex surface member disposed at each side of the channel;
    and extending along each bank of holder receiving stations, open-sided corralling hooks at each side of the channel and rearwardly of the frame with regard to the convex surface members, and patch cord loop forming brackets extending partly across the channel and rearwardly of the corralling hooks;
    the patch cords extending from said other faces, around the convex surface members to provide a minimum bend radius to the patch cords, through the corralling hooks into the channel and then over the patch cord loop forming brackets with excess lengths of the patch cords hanging as loops over the brackets.

43. A combination according to claim 26 wherein each holder comprises a guide rail projecting away from each side of the holder and at each side of the respective receiving station the frame has a guide channel for slidably receiving the guide rail.

44. A combination according to claim 43 wherein, in respect of each holder, a releasable latch is provided on the frame at each side of the respective receiving station, the latch engageable alternatively in either of two spaced recesses formed in the associated guide rail, said alternative engagement being dependent upon the location of the holder in the frame, and said releasable latch being releasable from either recess upon application of a load to slidably move the holder.

45. A combination according to claim 26 wherein each older comprises a connector guard movable into and out of a connector guarding position, in which it is located spaced forwardly in front of the mounting region and, with each holder in its first position, the respective guard is in its guarding position and, with each holder in its second position, the respective guard is movable into and out of its guarding position, the guard when out of the guarding position allowing for access from a position in front of the mounting region to said forwardly facing ends of the connectors.

46. A planar connector holder according to claim 45 wherein with each holder in its first position, the connector guards are all in their guarding positions and the connector guards collectively from a substantially continuous connector guard wall at the front of the frame.

47. An optical fiber distribution frame and connector holder combination comprising:
a distribution frame having a front and a rear and providing a first and second vertical banks of holder receiving stations with access at the front of the frame for insertion of each holder into a respective station, the first and second banks horizontally spaced apart to provide a forwardly opening vertical storage channel for fiber between the banks;
a plurality of connector holders, each holder for holding optical terminal connectors for optical fibers and comprising a plurality of mounting positions for optical terminal connectors, the mounting positions disposed in a series which extends from mounting position to mounting position along a front end region of the holder with optical terminal connectors located in the mounting positions and with one end of each connector facing forwardly from the front end region of the holder, the holders being slidably insertable into and removable from the receiving stations of the first and second banks without impinging upon the storage channel and with each older in the receiving station, the forward end region of each connector faces forwardly from the front of the distribution frame;
a plurality of groups of optical fibers which extend one group to each holder in each bank of receiving stations with the fibers in each group stored in coils in a storage facility in a corresponding holder and optically connected to the other ends of the connectors which face rearwardly of the holder;
and other fibers which are optically connected to the forward facing ends of the connectors in the two banks and extend into the storage channel between the two banks.

48. A combination according to claim 47 provided with means for locating each holder in a fully operative location in the respective receiving station and an access location forwardly of the operative location to allow for access to the mounting positions of the holder, from the front of the frame.

49. A combination according to claim 47 wherein said plurality of groups of optical fibers comprising a plurality of groups of incoming optical fibers extending one group to each holder int eh first bank of receiving stations, and a plurality of groups of outgoing optical fibers extending one group to each holder in the second bank of receiving stations, the other fibers are provided by patch cords each of which extends from an individual optical connector in a holder in the first bank to an individual optical connector in a holder in a second bank of receiving stations, and a patch cord positioning means is provided to position excess lengths of patch cord in the storage channel, each excess length of patch cord being supported by the positioning means to hang as a loop in the storage channel.

50. A combination according to either claim 47 or claim 49 wherein the distribution frame has stowage for the plurality of groups of optical fibers, the stowage extending alongside the banks of holder receiving stations and being accessible for insertion of the groups of fibers from the front of the frame.

51. A combination according to claim 50 wherein each connector holder has an inlet to its storage facility, the inlet being disposed adjacent to the mounting positions so as to face towards the stowage when the holder is in its receiving station.

* * * * *